United States Patent Office 3,032,572
Patented May 1, 1962

3,032,572
CYCLOPENTADIENYL NICKEL CARBONYL COMPOUNDS AND PROCESS THEREFOR
Ernst Otto Fischer, Munich-Solln, and Christof Palm, Ludwigshafen (Rhine), Germany, assignors to Union Carbide Corporation, a corporation of New York
No Drawing. Filed July 15, 1958, Ser. No. 748,584
Claims priority, application Germany July 16, 1957
9 Claims. (Cl. 260—439)

This invention relates to organometallic compounds of nickel and a method for producing them. More particularly, the invention relates to cyclopentadienyl nickel carbonyls and their preparation by the reaction of a dicyclopentadienyl nickel with nickel tetracarbonyl.

Organometallic compounds of transition metals which contain a cyclopentadienyl radical in addition to carbon monoxide have been known for a long time. They are prepared for instance by reacting cyclopentadienyl compounds of the metal in question with carbon monoxide under pressure, or by reacting the metal carbonyl with cyclopentadiene vapor. However, it has heretofore not been possible to produce corresponding compounds of nickel since when treating dicyclopentadienyl nickel with carbon monoxide under pressure, nickel tetracarbonyl is immediately produced and, conversely, when treating nickel tetracarbonyl with cyclopentadienyl vapor, dicyclopentadienyl nickel is formed. It therefore had to be assumed that nickel compounds which contain both a cyclopentadienyl radical and carbon monoxide in the same molecule were not stable.

It has surprisingly now been found that compounds of nickel which contain both a cyclopentadienyl radical and carbon monoxide in the same molecule can be prepared. The compounds of this invention may be represented by the formula $R_nNi_m(CO)_2$ wherein R is a group selected from the class consisting of cyclopentadienyl and alkyl-substituted cyclopentadienyl and the subscripts $n$ and $m$ are the same and may have the integral values 2 or 3. Examples of the compounds represented by this formula are dicyclopentadienyl dinickel dicarbonyl, $(C_5H_5)_2Ni_2(CO)_2$; di(ethylcyclopentadienyl) dinickel dicarbonyl, $(C_2H_5C_5H_4)_2Ni_2(CO)_2$; and tri(methylcyclopentadienyl) trinickel dicarbonyl, $(CH_3C_5H_4)_3Ni_3(CO)_2$.

The compounds of this invention may be prepared in a simple manner and in good yield by the reaction of nickel tetracarbonyl with a dicyclopentadienyl nickel. The dicyclopentadienyl nickels may be represented by the formula $R_2Ni$ wherein R is a group selected from the class consisting of cyclopentadienyl and alkyl-substituted cyclopentadienyl.

The reaction in accordance with the invention is advantageously carried out in a suitable inert organic solvent, for instance benzene, with the exclusion of atmospheric oxygen. In order to obtain good yields, it is advisable to operate at a moderately elevated temperature, for instance temperatures between 50 and 115° C. In general, the starting materials are used in approximately equimolar quantities. It is advantageous to use an excess of the more easily decomposable carbonyl. Depending on the reaction conditions and the method of purifying the reaction mixture, varying proportions of two volatile reaction products of different molecular weight and different organic group:nickel:carbon monoxide ratios are obtained. When the reaction is carried out at approximately atmospheric pressure, the compounds $R_2Ni_2(CO)_2$, $n$ and $m$ have the value 2 in the formula hereinabove, are produced in relatively large amounts and the compounds $R_3Ni_3(CO)_2$, $n$ and $m$ have the value 3 in the formula hereinabove, are produced in relatively small amounts. When the reaction is carried out under pressure, the compounds $R_3Ni_3(CO)_2$ are produced in relatively large amounts and only small amounts of the compounds $R_2Ni_2(CO)_2$ are obtained. All these products are readily soluble in numerous organic solvents and in crystalline form are stable for a long time in the air. The preparation of the compounds of this invention is illustrated by the following examples.

*Example I*

Ten milliliters of technical nickel-tetracarbonyl and 5.0 grams of dicyclopentadienyl nickel were dissolved in 60 milliliters of pure nitrogen-saturated benzene under nitrogen in a 250 milliliter three-neck flask provided with a reflux condenser, agitator, dropping funnel and excess pressure valve. Thereupon the solution was slowly heated on a water bath to between 70 and 80° C. After 3 hours, the solution had become red. The temperature was then raised, with continued stirring, to between 80 and 85° C. and kept at this temperature for several hours until the main portion of the nickel carbonyl had decomposed.

Thereupon the benzene was distilled off in vacuum, the unreacted nickel carbonyl passing over with it. The residue was subjected to sublimation in a high vacuum. In the sublimation step, the main portion of the unreacted dicyclopentadienyl nickel was first of all vaporized at 80 to 90° C. At 90 to 110° C., crystals of a dark green shimmer which appeared red in transmitted light and which were of substantially less volatility were obtained. These crystals were identified as dimeric cyclopentadienyl nickel carbonyl $(C_5H_5)_2Ni_2(CO)_2$.

The yield of the crystals of red color in transmitted light was 4.0 grams.

At a temperature above 140° C., there sublimed from the residue, crystals of a dark green shimmer having a deep brown color when seen in transmitted light, which crystals also contained nickel, carbon monoxide and cyclopentadienyl radicals in the molecule and which were identified as $(C_5H_5)_3Ni_3(CO)_2$.

*Example II*

Three grams of finely pulverized dicyclopentadienyl nickel and 15 mililiters of pure benzene were introduced into a 30 milliliter sealed tube of Jena glass. Thereupon the tube was cooled by placing it in a mixture of ice and sodium chloride. Seven milliliters of technical nickel tetracarbonyl were then introduced and the tube frozen. The tube was then evacuated and sealed closed.

Thereupon the tube was heated to room temperature, shaken well and heated at 105° C. for 60 hours. After opening the tube, brownish-red reaction mixture was filtered by means of a glass frit with the exclusion of air. The black crystals which remained on the filter were washed with cyclohexane until the cyclohexane passed through the filter with a yellow color. The crystals were introduced, with the exclusion of air, into an extraction thimble and extracted with cyclohexane. From the dark brown solution there was obtained, by filtration, after cooling, small crystal needles of a dark green glitter which are shown by analysis and molecular weight determination to have the formula $(C_5H_5)_3Ni_3(CO)_2$. The yield was 1.86 grams. A small quantity of $(C_5H_5)_2Ni_2(CO)_2$ was isolated from the wash cyclohexane.

The compound $(C_5H_5)_3Ni_3(CO)_2$ may also be prepared by thermal decomposition of the $(C_5H_5)_2Ni_2(CO)_2$ prepared in accordance with Example I by carrying out the sublimation of this compound at a temperature above about 130° C.

Compounds containing alkyl-substituted cyclopentadiene groups may be prepared in a similar manner. For example, the reaction of di(ethylcyclopentadienyl) nickel with nickel tetracarbonyl at atmospheric pressure yields primarily $(C_2H_5C_5H_4)_2Ni_2(CO)_2$ while the reaction of di(methylcyclopentadienyl) nickel with nickel tetracarbonyl under pressure produces primarily $$(CH_3C_5H_4)_3Ni_3(CO)_2$$

The compounds of the present invention may be used as catalysts for organic syntheses, for the preparation of nickel coatings and as fuel additives.

A nickel film may be deposited on a metal substrate such as copper by sealing the metal to be coated and a cyclopentadienyl nickel carbonyl compound of this invention in an evacuated glass tube. The tube is then heated to a temperature above the decomposition temperature of the nickel compound employed for about one hour. The tube is then cooled before removing the contents. The nickel film provides a corrosion-resistant coating for the metal substrate.

The cyclopentadienyl nickel carbonyl compounds of this invention may also be used to improve the anti-knock properties of hydrocarbon fuels of the types used in spark iginition engines. The compounds are readily soluble in hydrocarbons and such solutions are relatively stable on exposure to air.

What is claimed is:

1. As compositions of matter the organo-nickel compounds having the formula $R_nNi_m(CO)_2$ wherein R is a group selected from the class consisting of cyclopentadienyl and mono lower alkyl-substituted cyclopentadienyl and the subscripts $n$ and $m$ are the same and have integral values selected from the group consisting of 2 and 3.

2. Dicyclopentadienyl dinickel dicarbonyl, $$(C_5H_5)_2Ni_2(CO)_2$$

3. Di(methylcyclopentadienyl) dinickel dicarbonyl, $(CH_3C_5H_4)_2Ni_2(CO)_2$.

4. Di(ethylcyclopentadienyl) dinickel dicarbonyl, $$(C_2H_5C_5H_4)_2Ni_2(CO)_2$$

5. Tricyclopentadienyl trinickel dicarbonyl $$(C_5H_5)_3Ni_3(CO)_2$$

6. Tri(methylcyclopentadienyl) trinickel dicarbonyl, $(CH_3C_5H_4)_3Ni_3(CO)_2$.

7. Process for producing organo-nickel compounds having the formula $R_nNi_m(CO)_2$ wherein R is a group selected from the class consisting of cyclopentadienyl and mono lower alkyl-substituted cyclopentadienyl and the subscripts $n$ and $m$ are the same and have integral values selected from the group consisting of 2 and 3, which process comprises reacting a dicyclopentadienyl nickel compound having the formula $R_2Ni$, wherein R has the meaning defined hereinabove, with nickel tetracarbonyl.

8. Process in accordance with claim 7 wherein the reaction is carried out in an inert organic solvent.

9. Process for producing organo-nickel compounds having the formula $R_3Ni_3(CO)_2$ wherein R is a group selected from the class consisting of cyclopentadienyl and mono lower alkyl-substituted cyclopentadienyl, which process comprises heating a compound having the formula $R_2Ni_2(CO)_2$, wherein R has the meaning defined hereinabove, under reduced pressure to a temperature above about 130° C.

References Cited in the file of this patent

UNITED STATES PATENTS 2,849,471    Thomas _____ Aug. 26, 1958